United States Patent [19]

Robertson

[11] 3,955,016

[45] May 4, 1976

[54] FOIL COATING PROCESS

[75] Inventor: James Adolph Robertson, West Chester, Pa.

[73] Assignee: E. I. Du Pont de Nemours and Company, Wilmington, Del.

[22] Filed: Aug. 12, 1974

[21] Appl. No.: 496,852

[52] U.S. Cl. .............................. 427/178; 156/184; 156/280; 427/209; 427/211; 427/327; 427/388; 427/409
[51] Int. Cl.² ................. B32B 15/20; B32B 27/32; B05D 3/00
[58] Field of Search .......... 427/178, 409, 179, 209, 427/211, 327, 388; 156/90, 280, 184; 117/75, 66, 76 P, 72; 242/1

[56] References Cited
UNITED STATES PATENTS

| 3,479,197 | 11/1969 | Mork | 117/72 X |
| 3,488,252 | 1/1970 | Lamar | 117/76 P X |
| 3,696,498 | 10/1972 | Leontaritis et al. | 117/66 X |
| 3,787,326 | 1/1974 | Deyrup | 117/72 X |

*Primary Examiner*—Ralph Husack

[57] ABSTRACT

In a double-pass lamination and coating process, aluminum foil is laminated on one side with paper and then rolled for temporary storage before being coated on the other side with polyethylene. Contaminants from the paper impair the ability of aqueous solutions of chromium complex adhesion promoters to bond the polyethylene to the foil. A wash coat of polyvinyl alcohol before rolling eliminates this impairment.

8 Claims, 2 Drawing Figures

FOIL COATING PROCESS

BACKGROUND OF THE INVENTION

This invention relates to a process for the coating of polyethylene film on one side of aluminum foil. More particularly, it relates to such a process in which a support material is laminated to the other side of the foil and the foil is formed into a roll for temporary storage after lamination of the support material and before coating of the polyethylene.

It has been found that ingredients in the support material, such as hydrophobic additives encountered in paper making and especially lignin sulfate-sulfite ingredients in paper, will contaminate the opposite side of the aluminum foil when it is rolled for temporary storage after lamination of the foil and before its later priming and extrusion coating with polyethylene. This contamination interferes with wettability, preventing primers of adhesion promoters in aqueous solution from functioning. Similar contamination can also be experienced when the support material laminated to the first side of the foil is material other than paper, such as films of polyvinyl chloride, polyester or regenerated cellulose. Higher-cost support materials such as some clay-coated paper using certain binders in the clay provide little or no difficulties in subsequent extrusion coating of foil that has been rolled. However, less expensive paper is often machine-glazed to provide a good printable surface. Such materials may be treated with release agents such as silicones or stearates. Similar release agents may also be used on support materials other than paper. Release agents and other hydrophobic additives, as well as lignins in paper, may cause problems in the wettability of the foil.

The support materials are generally used as backings for thin aluminum foil in the packaging industry to provide the strength needed for handling. The support materials are also often chosen for their printability, providing a surface which readily accommodates decoration and messages.

Such contamination is not a problem in a tandem extruder operation where a paper laminate is adhered to the first side of the foil by extruded polyethylene and then, without rolling the foil for temporary storage, or rolling it only for a short time such as less than about 2 hours, the second side is coated with an adherence promoter fumarato chromium nitrate and extrusion coated with polyethylene. However, some facilities have only one extruder and need to roll the foil and store it for some time after applying the paper so that the extruder can be switched to apply the polyethylene to the second side. Whatever the reason for rolling and storing the paper-coated foil, materials in the paper contaminate the second side of the foil in the roll and cause inadequate adhesion of the polyethylene through the fumarato chromium nitrate. The contamination seems to limit the wettability and reactivity of the foil by the fumarato chromium nitrate solution.

Adhesive primers commonly used in the extrusion coating and laminating of polyethylene and aluminum are of a polymeric nature and use organic solvents permitting use of shellac wash coats to prevent contamination in rolled paper laminates. The primer dissolves the shellac and makes a good bond. However, aqueous solutions of chromium complexes such as fumarato chromium nitrate, which have very desirable adhesion characteristics, do not dissolve shellac wash coatings. Thus, different means for preventing paper and other contamination in rolls need to be found.

The composition, preparation and use of fumarato chromium nitrate and related chromium (III) coordination complexes which are preferred as adherence promoters in adhering polyethylene to aluminum are described in U.S. Pat. No. 3,787,326 — Deyrup, assigned to the assignee of the present invention. Other chromium (III) coordination complexes with useful adherence promoting properties are known in the art.

It would be desirable to find a process permitting single-pass extrusion for coating paper on one side of foil, rolling the foil for temporary storage, and then priming the other side of the foil with fumarato chromium nitrate and extrusion coating that side with polyethylene having improved durable adhesion.

SUMMARY OF THE INVENTION

The present invention, in certain of its embodiments, provides, in a process for the extrusion coating of a film of polyethylene onto an elongated sheet of aluminum foil wherein a layer of support material is adhered to a first surface of the foil and the foil is then rolled up for temporary storage before the extrusion coating of the film of polyethylene onto the second surface of the foil, and wherein the adhesion of the polyethylene to the foil is enhanced by applying to the second surface of the foil an aqueous solution of chromium (III) coordination complex adherence promoter after storage and before extrusion coating, a method for protecting the second surface of the foil from contamination from the support material which could impair adhesion of the polyethylene to said second surface, said method comprising applying to the second surface of the foil before the foil is rolled for temporary storage a wash coat of polyvinyl alcohol dissolved in water and drying said wash coat.

In preferred embodiments, the chromium (III) coordination complex is a fumarato chromium nitrate complex, and the polyvinyl alcohol is applied at a concentration in the range of about 0.0005 to 0.0015 pound per 3000 square feet of foil surface from an aqueous solution having a concentration in the range of about 0.025 to 0.075 percent by weight polyvinyl alcohol, and the polyvinyl alcohol is essentially completely hydrolyzed. (Percentages and proportions herein are by weight except where indicated otherwise.)

DESCRIPTION OF THE PREFERRED EMBODIMENTS

Surprisingly, applicant has found that, although many materials that might potentially be used as wash coats in the invention either do not maintain the wettability of the aluminum or lead to inferior adhesive strength or durability, polyvinyl alcohol gives quite desirable results. This permits the use of fumarato chromium nitrates for the single-extruder, double-pass coating of aluminum foil.

Unsatisfactory results in wettability, adherence strength or durability of adhesive bonds were obtained using the following materials as wash coats at various concentration levels:

fumaric acid
sodium silicate
positively charged colloidal silica
polyvinyl pyrrolidone
hydroxyethyl cellulose
polyethylene oxide glycol
methyl cellulose
carboxmethyl cellulose.

Also, the addition of 20 to 50 percent isopropanol to the primer bath did not permit wetting of the foil by the primer.

As is known in the art, polyvinyl alcohol is made by alcoholysis or hydrolysis of polyvinyl acetate. Fully hydrolyzed material has more than about 99 percent of the acetate groups converted to hydroxyl groups. Polyvinyl acetate can be partially hydrolyzed to give partially hydrolyzed grades of polyvinyl alcohols. For purposes of the present invention, and to obtain the desired water solubility, at least about 80 percent of the acetate groups should be converted to hydroxyl groups. Desirable polyvinyl alcohol for use in the invention is at least about 88 ± 1 percent hydrolyzed, and the preferred material is fully hydrolyzed.

Figure 1:
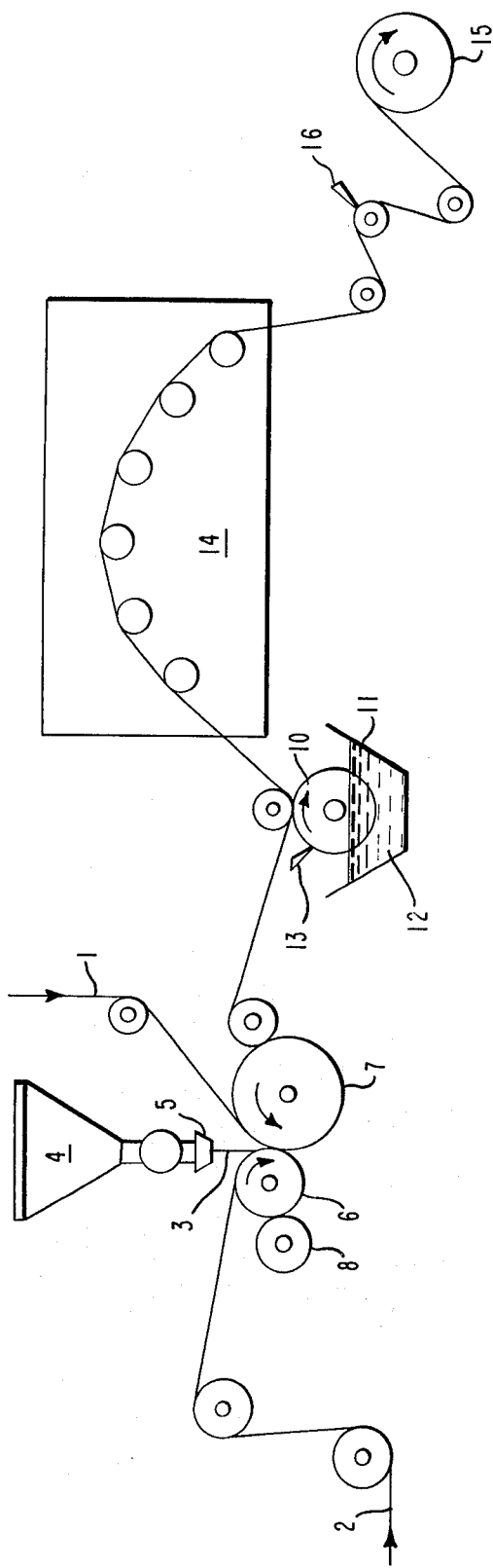
FIG. 1 is a schematic diagram of equipment operating part of the invention wherein the foil is laminated with paper and the polyvinyl alcohol wash coat is applied.

Turning now to the drawing, FIG. 1 shows the application of a layer of paper 1 to a semicontinuous elongated web of aluminum foil 2 by extrusion of molten polyethylene 3 at a temperature of about 324° to 326.7°C from an extruder 4 through a die 5 onto the first side of foil 2 above a pressure roll 6. Paper 1 is pressed against foil 2 after coating with molten polyethylene 3 by chill roll 7, and pressure roll 6 is urged against chill roll 7 by backup roll 8. The technology for such extrusion coating and laminating is well known in the art. As implied by its name, chill roll 7 acts to draw heat out of molten polyethylene 3 and harden it onto foil 2. The foil 2 is then coated on its reverse side by a gravure roll 10 wet by rotating in a bath 11 of wash coat 12, with the excess liquid being removed from gravure roll 10 by doctor blade 13.

With a gravure roll having a surface adapted to apply the wash coat at a rate of 2 pounds per ream of foil (3000 square feet), a concentration of 1 to 3 grams of polyvinyl alcohol per gallon of water will give the desired application rate of about 0.0005 to 0.0015 pound per ream.

After wash coating, the foil is dried to evaporate the water in drying oven 14, and then rolled onto roll 15. Slitter 16 is used to cut the foil when a roll is completed.

Figure 2:
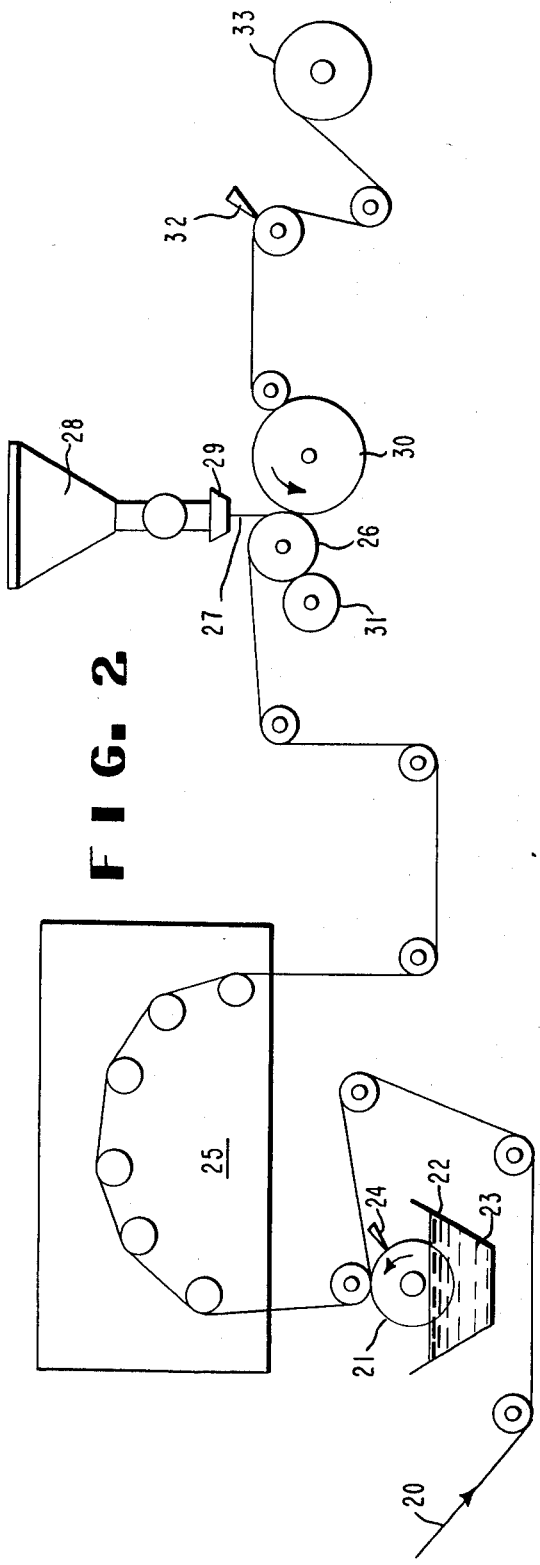
FIG. 2 is a similar diagram showing application of the chromium complex and extrusion coating of the polyethylene film onto the foil.

When the foil is to be extrusion coated with polyethylene, it is unrolled and fed to the apparatus shown in FIG. 2. Equivalent functions are served by this apparatus as by that of FIG. 1, with the gravure roll coater applying the aqueous primer solution of fumarato chromium nitrate which is then dried. The extrusion coater then puts on a layer of polyethylene which adheres satisfactorily to the foil.

Paper-laminated foil 20 is contacted on its reverse side (the side opposite the paper) by gravure roll 21 wet by rotating in a bath 22 of primer 23, with the excess liquid being removed from roll 21 by doctor blade 24. The foil 20 is then dried in drying oven 25 and fed directly to pressure roll 26 on which it receives molten polyethylene 27 at a temperature of about 313° to 315.5°C from extruder 28 through die 29. Chill roll 30, backup roll 31, slitter 32 and roll 33 serve functions similar to those of the corresponding apparatus in FIG. 1.

Since the costs of full scale lamination and extrusion coating operations inhibit experimentation, a laboratory simulation was devised to evaluate and illustrate the ability of wash coats to act as barriers to contaminants but still permit effective priming and adhesion.

First, a stack of alternating layers of 5 mil thick aluminum foil, treated with a wash coat or untreated, and 25 pound/ream bleached Kraft paper was held for 5 days at room temperature under a pressure of 6000 psi. After this procedure, the untreated foil surface was found to be not wettable by a water solution of fumarato chromium nitrate.

The aluminum foil before pressing in the stack either was degreased by cleaning in hot alkaline detergent solution, rinsing with water and drying, or was wash coated by dipping in an aqueous solution of the wash coat, draining vertically, and drying horizontally. The wash coat was applied at a concentration of 9 pounds per ream before drying.

Foil that had been contaminated by pressing in the stack, some with and some without the wash coat, was treated with a water solution of fumarato chromium nitrate (FCN) at a concentration of about 0.06 percent chromium equivalent by dipping in the solution for 30 seconds, rinsing with distilled water, and drying at 60°C in a forced draft air oven.

Adhesive bonds were then made by pressing a 5 mil glue line of high density polyethylene containing 5 percent powdered microporous alumina at 3000 psi pressure and 175°C for 5 minutes between two faces of aluminum foil subjected to the above treatments. T-peel strengths were then measured. Clean foil not contaminated by the stack pressing with paper gave peel strengths of 34 to 39 pounds per inch width, and these values are used as the control.

Wash coats of polyvinyl alcohol that was fully hydrolyzed (PVA-I) and a partially hydrolyzed grade of polyvinyl alcohol, about 87 to 88 percent hydrolyzed (PVA-II) were applied at a rate of 9 pounds total solution per ream. The results given in Table I below show the need for the wash coat.

TABLE I

PREVENTION OF FOIL CONTAMINATION
USE OF PVA WASH COATS

| Test No. | Wash Coat - PVA Solution Grade | % Solids | Foil Treatment Contaminated | FCN | Adhesion lb/in Peel | Failure |
|---|---|---|---|---|---|---|
| 1 | — | — | — | x | 38.6 | cohesive |
| 2 | — | — | x | x | 12.0 | adhesive |
| 3 | PVA-I | 0.05 | x | x | 34.0 | cohesive |
| 4 | PVA-I | 0.01 | x | x | 36.4 | cohesive |
| 5 | PVA-I | 0.005 | x | x | 38.3 | cohesive |
| 6 | PVA-II | 0.05 | x | x | 39.8 | cohesive |
| 7 | PVA-II | 0.01 | x | x | 38.4 | cohesive |
| 8 | PVA-II | 0.005 | x | x | 37.6 | cohesive |

A confirmatory set of tests was made using commercial extrusion coating equipment. PVA-I and -II were applied from solutions having the indicated concentrations at 1.5 to 2.0 pounds per ream. After laminating and rolling, with and without wash coats, priming with fumarato chromium nitrate as described above was used, and then the foil was extrusion coated. Different periods of roll storage before priming were used, and then samples were held in a 1:1 by weight solution of water and isopropanol for 2 and 4 weeks at two temperatures to test adhesion durability. Table II below shows the results of the tests. "IS" means inseparable; "Delam" means the material delaminated and showed no adhesion; the g/in values are T-peel strengths in grams per inch of specimen width.

TABLE II

DURABILITY OF PE/AL FOIL ADHESION

| Test No. | Wash Coat PVA | % Solids | Laminate Storage Period | Initial | 1:1 H₂O:Isopropyl Alcohol 2 Weeks | | 4 Weeks | |
|---|---|---|---|---|---|---|---|---|
| | | | | | 73°F | 105°F | 73°F | 105°F |
| 9 | — | — | 2 hrs | IS | IS | IS | IS | IS |
| 10 | — | — | 3 days | Delam. | Delam. | Delam. | Delam. | Delam. |
| 11 | PVA-I | 0.278 | 2 hrs | IS | IS | IS | IS | IS |
| 12 | PVA-I | 0.055 | 3 days | IS | IS | IS | IS | IS |
| 13 | PVA-II | 0.278 | 2 hrs | 177 g/in | Delam. | IS | 15 g/in | IS |

What is claimed is:

1. An improved method for the extrusion coating of a film of polyethylene onto an elongated sheet of aluminum foil wherein a layer of support material is adhered to a first surface of the foil and the foil is then rolled up for temporary storage before the extrusion coating of the film of polyethylene onto the second surface of the foil, and wherein the adhesion of the polyethylene to the foil is enhanced by applying to the second surface of the foil an aqueous solution of chromium (III) coordination complex adherence promoter after storage and before extrusion coating, wherein the improvement comprises, a method for protecting the second surface of the foil from contamination from the support material which could impair adhesion of the polyethylene to said second surface, said method comprising applying to the second surface of the foil before the foil is rolled for temporary storage a wash coat of polyvinyl alcohol dissolved in water and drying said wash coat.

2. A method according to claim 1 wherein said polyvinyl alcohol is applied at a concentration in the range of about 0.0005 to 0.0015 pound per 3000 square feet of foil surface.

3. A method according to claim 1 wherein said polyvinyl alcohol is applied by a gravure roll from an aqueous solution having a concentration in the range of about 0.025 to 0.075 percent by weight polyvinyl alcohol.

4. A method according to claim 1 wherein said adherence promoter is a fumarato chromium nitrate.

5. A method according to claim 1 wherein at least about 80 percent of the acetate groups of the precursor polyvinyl acetate have been converted to hydroxyl groups in the polyvinyl alcohol.

6. A method according to claim 1 wherein at least about 88 percent of the acetate groups of the precursor polyvinyl acetate have been converted to hydroxyl groups in the polyvinyl alcohol.

7. A method according to claim 1 wherein said polyvinyl alcohol is fully hydrolyzed.

8. A method according to claim 1 wherein said support material is paper.

* * * * *